UNITED STATES PATENT OFFICE.

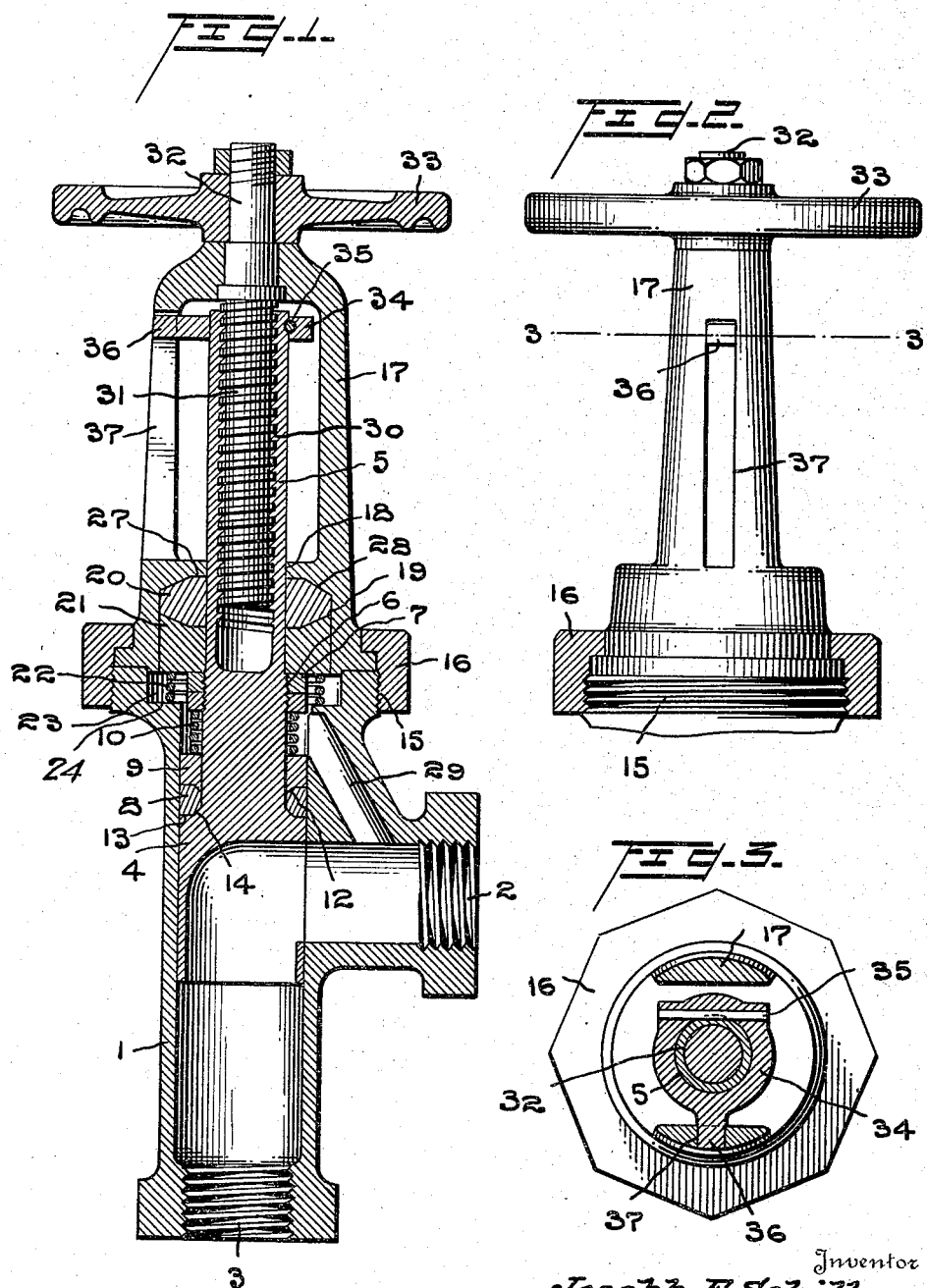

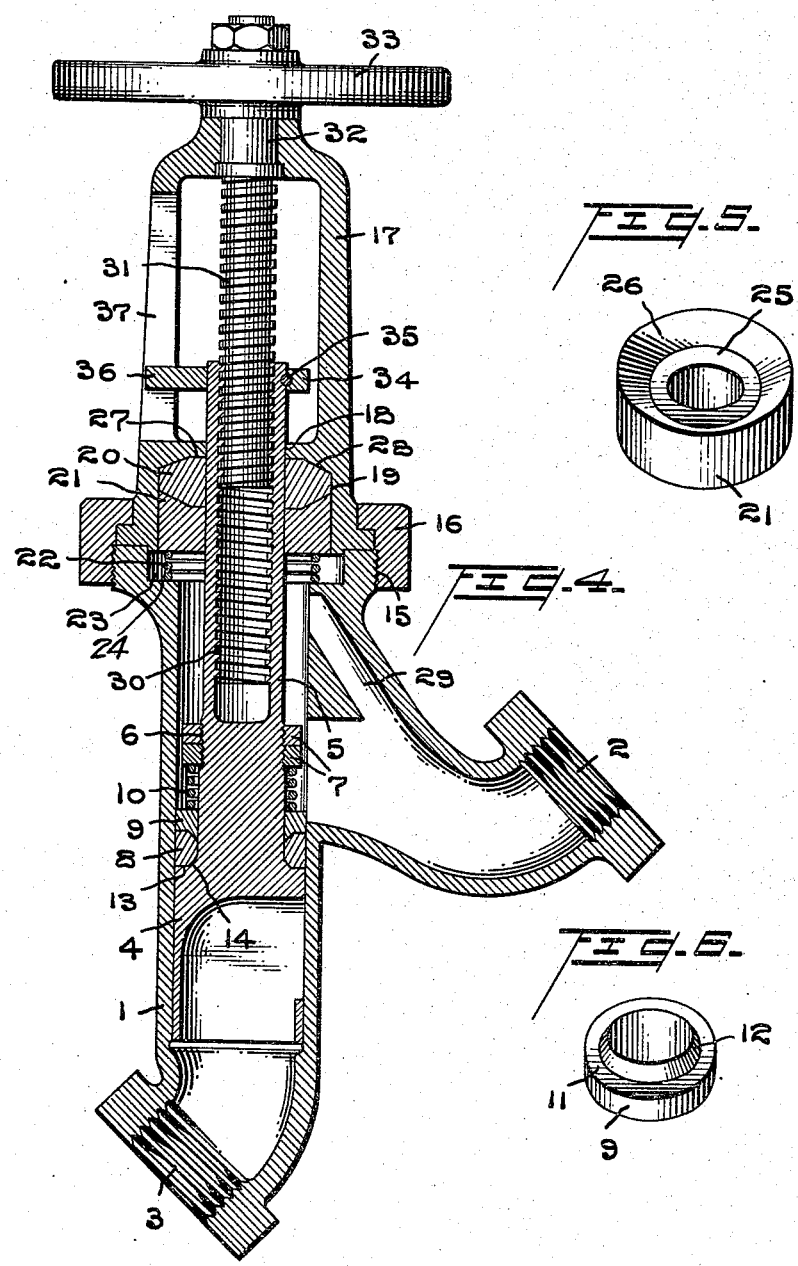

JOSEPH F. SCHILLER, OF PHILADELPHIA, PENNSYLVANIA.

BLOW-OFF VALVE FOR STEAM-BOILERS.

1,166,638.

Specification of Letters Patent. Patented Jan. 4, 1916.

Application filed May 17, 1915. Serial No. 28,566.

*To all whom it may concern:*

Be it known that I, JOSEPH F. SCHILLER, a citizen of the United States, residing at Philadelphia, in the county of Philadelphia and State of Pennsylvania, have invented certain new and useful Improvements in Blow-Off Valves for Steam-Boilers, of which the following is a specification.

My invention relates to improvements in blow off valves for steam boilers, and more particularly to a blow off valve for steam boilers in which the piston valve is balanced in opening and closing so as to permit the valve to be readily manipulated without exerting undue force.

A further object is to provide a blow off valve in which the packing around the stem, as well as around the piston valve, is maintained tight by the pressure of steam.

A further object is to provide a valve of the character stated in which the packing ring around the stem can be manually tightened by drawing the valve past its full open position.

A further object is to provide an improved combination of valve and stem packing which are engaged by rings movable on the stem and having springs holding the rings in normal position, and preventing movement of the packing on the stem, but I would have it understood that I do not rely upon the springs to hold the packing but utilize the steam pressure to maintain the packing tight.

A further object is to provide a blow off valve of the character stated which is steam tight, which is comparatively simple in construction, which can be manufactured and sold at a reasonably low price, which is strong and durable in use, and which overcomes the defects of valves heretofore known.

With these and other objects in view, the invention consists in certain novel features of construction and combinations and arrangements of parts as will be more fully hereinafter described and pointed out in the claims.

In the accompanying drawings: Figure 1 is a view in longitudinal section illustrating my improvements showing the valve in open position and in a body of the angle type. Fig. 2 is a fragmentary view partly in elevation and partly in section illustrating the yoke and the union connecting the same to the valve body. Fig. 3 is a view in transverse section on the line 3—3 of Fig. 2. Fig. 4 is a view in longitudinal section illustrating the valve in closed position showing the same in connection with a body of the straightway type. Fig. 5 is a perspective view of the shield 21, and Fig. 6 is a perspective view of the shield 9 showing the latter in an inverted position.

1 represents the body of the valve having an inlet 2 and an outlet 3, and this body may be either of the angular type shown in Fig. 1, or of the straightway type shown in Fig. 4, and as these types of body are common in the trade, I make no claim thereto, but illustrate both forms to show that my improved valve may be operated with equal efficiency with either style of body. The main portion of the body has a cylindrical bore in which my improved piston valve 4 snugly fits. This valve 4 is made integral with a stem 5 which extends above the upper end of the body, and is screw-threaded throughout a portion of its length as shown at 6 to receive nuts 7 thereon. It is, of course, to be understood that the portion of the valve stem 5 where the threads 6 are located is slightly larger in diameter than the end of the stem to allow the nuts to be inserted and removed, but this difference may be very slight as indicated.

A packing ring 8 is located around the stem 5 against the end of valve 4, and is engaged by a shield 9 movable on the stem and held against the packing by a coiled spring 10 located around the valve stem between the nuts 7 and the shield 9. The shield 9 on its lower face is flat from its outer edge inwardly as shown at 11, and then tapers or inclines downwardly forming an annular beveled extension 12 which engages behind the packing ring 8 and tends to force the packing ring outwardly against the walls of the casing. The end of piston valve 4 is flat for a distance inwardly as shown at 13, and then bevels or inclines upwardly as shown at 14, and the packing ring 8 is of a shape to fit the surfaces of shield 9 and the piston end, so that pressure upon the shield not only tends to force the packing ring outwardly, but also tends to compress the ring between the flat surfaces, and thereby insure a tight juncture.

The upper end of the body 1 is externally screw-threaded as shown at 15, and a union 16 is screwed onto the threaded end of the body and securely clamps a yoke 17 in position on the end of the body. The valve stem 5 projects through an opening 18 in the lower portion of the yoke, and this lower portion of the yoke is recessed as shown at 19 to accommodate a packing ring 20 and a shield 21. A coiled spring 22 which bears at its upper end against shield 21 is housed within a recess 23 in the upper end of body 1, and at its lower end bears against the bottom wall 24 of said recess. The shield 21 adjacent its central opening has a flat surface 25, and the outer portion of said shield flares or inclines outwardly from said flat portion 25 to the outer edge of the shield constituting a beveled bearing surface 26 to engage the packing ring 20. The upper end of recess 19 in yoke 17 is made with a flat bearing surface 27 adjacent the opening 18, and then said end wall flares downwardly toward the outer wall of the recess forming a beveled surface 28. The packing ring 20 is shaped to fit the several beveled and flat surfaces above described on the shield 21, and the yoke 17, so that when pressure is had upon the shield 21, it tends to force the packing ring tightly around the valve stem and also tends to compress the ring, so that the stem is maintained steam and water tight.

A passage 29 is formed in the valve body 1, connecting the inlet 2 with the upper portion of the body 1, so that the shield 21 as well as the shield 9 are always maintained in communication with the direct pressure of steam and water, so that the pressure of steam upon the shields operates to maintain the packing rings tight.

The spring 22 is strong enough to prevent the shield 21 and packing ring 20 from following the stem 5 in its movement, but I would have it understood that I do not rely upon the springs 10 and 22 to hold the packing rings tight, but utilize the pressure of steam for the purpose.

The upper end of the stem 5 is hollow and internally screw-threaded as shown at 30 to receive the screw-threaded lower end 31 of the valve adjusting rod 32. The rod 32 is supported in the upper end of the yoke 17, and is provided with a hand wheel 33 to turn the same.

A dog 34 is secured by a pin 35 to the upper end of valve stem 5, and is provided with a key 36 which moves in a longitudinal slot 37 in one member of the yoke to hold the valve and stem against rotary movement, but permit longitudinal movement as desired.

By reference to Figs. 1 and 4, it will be noted that in both positions of the valve, the shields 9 and 21 receive the direct pressure, and hence the packing rings 8 and 20 are maintained tight because of the fact that they receive a uniform pressure of steam and the life of the valve without renewal of packing is greatly increased. Furthermore, it will be noted that the valve is an easy opening and closing valve because the passage 29 acts as a by-pass to allow the water to flow to the upper end of the body and equalize pressure.

While my invention is of course not limited to the particular material from which the rings 8 and 20 are made, I preferably form them of metal or of a suitable composition which is best adapted for the use, but I may also make them of fiber or any other material.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A blow off valve for steam boilers, comprising a body having a cylindrical bore, said body having an inlet and an outlet, a piston valve fitting the bore and having a stem projecting above the body, a yoke secured to the upper end of the body and having a recess in its lower end, said body having a recess in its upper end communicating with the recess in the yoke, and having a passage connecting said recess in the body with the inlet of the body, a packing ring around the stem in the recess of the yoke, a shield around the stem in the recess of the yoke, a packing ring around the stem against the end of the valve, a shield around the stem against the last-mentioned packing ring, and elastic means holding both of said shields against their packing rings, substantially as described.

2. A blow off valve for steam boilers, comprising a body having a cylindrical bore, said body having an inlet and an outlet, a piston valve fitting the bore and having a stem projecting above the body, a yoke secured to the upper end of the body and having a recess in its lower end, said body having a recess in its upper end communicating with the recess in the yoke, and having a passage connecting said recess in the body with the inlet of the body, a packing ring around the stem in the recess of the yoke, a shield around the stem in the recess of the yoke, a packing ring around the stem against the end of the valve, a shield around the stem against the last-mentioned packing ring, elastic means holding the last-mentioned shield against its packing ring, and a spring located in the recess in the upper end of the body and exerting pressure on the first-mentioned shield, substantially as described.

3. A blow off valve for steam boilers, comprising a body having a cylindrical bore, said body having an inlet and an outlet, a piston valve fitting the bore and having a stem projecting above the body, a yoke secured to the upper end of the body and having a recess in its lower end, said body having a recess in its upper end communicating with the recess in the yoke, and having a passage connecting said recess in the body with the inlet of the body, a packing ring around the stem in the recess of the yoke, a shield around the stem in the recess of the yoke, a packing ring around the stem against the end of the valve, a shield around the stem against the last-mentioned packing ring, and respective coiled springs exerting constant pressure on said shields, substantially as described.

4. A blow off valve for steam boilers, comprising a body having a cylindrical bore, said body having an inlet and an outlet, a piston valve fitting the bore and having a stem projecting above the body, a yoke secured to the upper end of the body and having a recess in its lower end, said body having a recess in its upper end communicating with the recess in the yoke, and having a passage connecting said recess in the body with the inlet of the body, a packing ring around the stem in the recess of the yoke, a shield around the stem in the recess of the yoke, a packing ring around the stem against the end of the valve, a shield around the stem against the last-mentioned packing ring, respective coiled springs exerting constant pressure on said shields, said shields and packing rings having beveled and flat faces, the upper shield tending to press its packing around the stem, and the lower shield tending to force its packing ring outward against the bore of the body, substantially as described.

5. A blow off valve for steam boilers, comprising a body having a cylindrical bore, and an annular recess in its upper end communicating with the bore, said body having an inlet in its side, an outlet in its end, and a passage connecting the inlet with the upper recessed portion of the body, a yoke secured on the upper end of the body and having an opening therein, a piston valve fitting the bore of the body and having a stem projecting through the opening in the yoke, packing rings around the stem adjacent the piston and the opening in the yoke respectively, shields around the stem against the packing rings, nuts screwed onto an intermediate portion of the stem, a coiled spring around the stem between the nuts and the piston packing ring shield, a second spring located in the recess in the body bearing at one end against the end wall of said recess and at its other end against the stem packing ring shield, means for preventing rotary movement of the valve, and means for moving the valve longitudinally, substantially as described.

In testimony whereof I have signed my name to this specification in the presence of two subscribing witnesses.

JOSEPH F. SCHILLER.

Witnesses:
   CHAS. E. POTTS,
   MARIE JACKSON.